US012667818B2

(12) United States Patent
Henry

(10) Patent No.: US 12,667,818 B2
(45) Date of Patent: Jun. 30, 2026

(54) ZERO CONTACT SCREW AND ERGONOMIC HOUSING PORTIONING DEVICE

(71) Applicant: Henry & Sons, Inc., Bradley, CA (US)

(72) Inventor: Mark Henry, Bradley, CA (US)

(73) Assignee: Henry & Sons, Inc., Bradley, CA (US)

( * ) Notice: Subject to any disclaimer, the term of this patent is extended or adjusted under 35 U.S.C. 154(b) by 991 days.

(21) Appl. No.: 17/868,255

(22) Filed: Jul. 19, 2022

(65) Prior Publication Data

US 2023/0020904 A1 Jan. 19, 2023

Related U.S. Application Data

(60) Provisional application No. 63/223,411, filed on Jul. 19, 2021.

(51) Int. Cl.
*B01F 27/00* (2022.01)
*B01F 27/1143* (2022.01)
*B01F 27/723* (2022.01)
*B01F 101/06* (2022.01)

(52) U.S. Cl.
CPC ........ *B01F 27/1143* (2022.01); *B01F 27/723* (2022.01); *B01F 2101/06* (2022.01)

(58) Field of Classification Search
CPC ................ B01F 27/1143; B01F 27/723; B01F 2101/106; B01F 27/722; B01F 27/72
See application file for complete search history.

(56) References Cited

U.S. PATENT DOCUMENTS

2003/0178375 A1* 9/2003 Sharpe .................... B01F 27/71 366/279
2016/0144373 A1* 5/2016 Haas ................... B01F 27/1143 366/343
2020/0238235 A1* 7/2020 Schötzau .............. B29C 48/687

* cited by examiner

*Primary Examiner* — Anshu Bhatia
(74) *Attorney, Agent, or Firm* — G. Harley Blosser; Sandberg Phoenix & von Gontard, PC

(57) ABSTRACT

A zero contact double screw and ergonomic double screw housing combination for foodstuff mixers and portioning devices. The system includes a multi-prong support segment at the discharge end of the double screw and double screw housing which connects and secures the double screw to the double screw housing to support and space the double screw apart from the surrounding double screw housing in a configuration which eliminates contact between the outer surface of the double screw and the inner surface of the double screw housing. The housing has an exterior portion with scooped out portions providing for substantially reduced thickness, volume, and mass, while remaining configured to provide durability and longevity of use similar to that of a screw housing that is substantially fully cylindrical throughout its diameter.

11 Claims, 2 Drawing Sheets

ZERO CONTACT SCREW AND ERGONOMIC HOUSING PORTIONING DEVICE

CROSS-REFERENCE TO RELATED APPLICATIONS

This application claims priority to U.S. App. No. 63/223,411 filed Jul. 19, 2021, which is entitled Zero Contact Double Screw Portioning Device, and which is incorporated herein by reference.

STATEMENT REGARDING FEDERALLY SPONSORED RESEARCH

Not Applicable.

BACKGROUND OF THE DISCLOSURE

The present disclosure relates to vacuum filling and portioning machines for the food processing industry. In particular, the invention relates to essentially zero contact screw-highly ergonomic screw housing devices for use in such filling and portioning machines.

Two key components of such vacuum filling and portioning machines, which work in close tandem, are the heavy-duty multiple, usually double, screws or "worms" and the housing units in which such screws fit during portioning, mixing, and filling of various foodstuffs such as sausages, vegetable mixes, doughs, and pet foods. The screw or worm units consist of rotating screws. Typically, one is a large, left-handed helical screw and one is a large right handed helical screw in which the two screw shanks of such a double screw are intimately entwined around each other inside the housing unit in a substantially continuously double-curved fashion and rotate in place within the cylindrical housing unit to grind up and mix such foodstuffs. The curved shank of each of the two halves of the double screw, and their housing unit as a whole, are laid out in a substantially horizontal direction in relationship to the vacuum filler machine as a whole. As the mixing and filler machine processes the foodstuffs, parcels of food are pulled by vacuum pressure through an entrance hole into the housing unit and are mixed and massaged into a predetermined processed configuration before extrusion.

Moreover, as indicated, these screws or worms of the vacuum fillers are contained within substantially cylindrical housing units which are also a key part of the overall processing systems used in the filling, extruding, and portioning of the variety of foodstuffs mentioned above. These screws and their housings (i.e., the actual elements which, in tandem, process and portion foodstuffs), many of which originate from the German company known as Vemag Machinebau GmbH (hence, called Vemag filler machines), need to be handled and then cleaned with great frequency in the food portioning and processing industry for sanitation considerations. Hence, any extra heaviness of such housing machine parts, which, e.g., in conventional screw housings generally register well above sixty pounds, is an important drawback to the ease and safety of employee handling for such regularly manipulated and cleaned food processing components.

The double screws have also traditionally been supported inside the housing solely by a centering pin on the drive end, i.e., the end of the double screw attached to the drive motor.

However, due to their close contact and ongoing interaction, outward pressures force the outer diameter of the double screws constantly against the inner diameter of the double screw housing. This constant friction between these two components causes immediate and ongoing wear and results in a metal on metal debilitating condition. Both the double screw and the housing units which contain them are thus continuously worn down, resulting in significant loss of useful life for both the double screw unit and the double screw housing unit.

In summary, the double screw and double screw housing components are valuable pieces of equipment in a food processor's arsenal which have been used, almost unchanged, for approximately seventy years.

Accordingly, what is needed is an improved, essentially zero contact screw portioning—ergonomic screw housing unit combination whose interaction substantially reduces any friction between the screw portioning and the screw housing units during extended use. Moreover, a combination is needed which, because of improved ergonomic design, has a housing that is substantially lighter and is more readily handled by employees and other users, yet maintains the durability, strength, and longevity, as well as other highly regarded characteristics, of market leading screw—screw housing unit combinations for the food processing industry. Such improvements would thereby significantly improve both the useful life and functionality of these key components in vacuum filling, mixing and portioning machines.

SUMMARY OF THE DISCLOSURE

Applicant has developed an improved multiple screw and multiple screw housing, hereinafter referred to by their most common forms, "double screw" plus "double screw housing" unit device for vacuum filler systems which provides for an essentially zero, reduced friction interaction between the double screw and the double screw housing unit. Moreover, the combination has been streamlined by the inclusion of an ergonomically improved housing fitted to contain the portioning double screws. Such an ergonomically configured design carves out substantial exterior portions of the housing cylinder which added extensively to the overall weight in prior art housing units. Thus, such ergonomically configured designs provide for substantially lighter screw-screw housing combinations, yet ones which retain substantially the same durability and longevity given similar use and materials as conventional screw housing units and thereby overcome the deficiencies of conventional, but much heavier units. The disclosure thus effectively overcomes the above deficiencies of prior double screw-screw housing units used in food portioning devices.

In one aspect, a multiple screw-screw housing combination device is provided which includes a multi-pronged (hereinafter referred to, representatively, as a cross-like) support segment at the discharge end of the double screw unit which connects the double screw to the double screw housing to support and space the double screw portions of the device apart from the surrounding double screw housing, and thus avoid or reduce contact between any portion of the outer diameter of the double screw and the inner diameter of the double screw housing. In the exemplary embodiment using a cross-like support segment, the segment includes a substantially vertical first cross portion with top and bottom halves to fit into notches located at the top and bottom of the discharge end of the double screw housing. The cross-like support segment also includes a substantially horizontal second cross portion with first and second lateral side portions, each of which defines a bored hole for the insertion of a bolt. Shouldered bolts or other connectors are secured into the bored holes at the discharge end through each of these bored holes. In turn, at the discharge end of each of the double screws is a mated hole for one of the lateral holes of the cross-like support. Thus, the shouldered bolts slide into the laterally spaced bored holes of the cross-like support and into the mated holes at, e.g., the center of the discharge end of each of the double screw units. Accordingly, this combination serves to center and secure the double screw units inside the double screw housing, aiding in providing substantially zero, or at least substantially reduced, metal to metal contact between the double screw units and the double screw housing unit. To further assist in producing zero, or substantially reduced contact within the device, the inner diameter of the double screw housing and the outer diameter of the double screw units are matched throughout the parallel dimensions of the two components so that any contact is eliminated or substantially reduced when the discharge end of the double screw is so centered and secured.

In another aspect, as described, a multi-pronged, e.g., in an embodiment, a substantially cross-like, support device for the discharge end of such double screw units is presented herein. The support device centers and connects the double screws to the double screw housing to securely space the double screw units apart from the surrounding double screw housing so as to align the two to fully avoid or substantially reduce contact between any portion of the outer diameter of the double screw units and the inner diameter of the double screw housing. In such an embodiment, the cross-like support segment includes a substantially vertical first cross portion with top and bottom halves configured to fit into notches or similar receptacle areas located at the top and bottom of the discharge end of the double screw housing for their secure placement. In this embodiment, the cross-like support segment also includes a substantially horizontal second cross portion with first and second lateral side portions, each of which defines a bore at a position facing a, e.g., center hole of the discharge end of each of the double screw units for the insertion of a bolt. Shouldered bolts or other fasteners for securing the cross-like support into such center holes of the discharge end of each of the double screw units can be part of the securement ensemble or provided separately.

In another aspect, the multiple screw/double screw units-screw housing combination as disclosed herein has a housing unit in which the previously fully cylindrical exterior portion of the housing has cut or carved out exterior portions that provide for a substantially lighter housing and screw-housing combination, yet one which retains the same or substantially similar durability and longevity given the same use and material as conventional screw/screw housing combinations.

In this aspect, an ergonomically designed multiple screw or mixer housing as previously described herein has an overall substantially cylindrical body with a substantially cylindrical internal bore into which multiple screws or mixer units are fit into during operation and an exterior portion, with open areas at each end of the housing. The exterior portion of the housing has a top and bottom section along its longitudinal axis. On the top side, an orifice connecting to a food hopper may be present through which foodstuff of one type or another is introduced from the food hopper to the food mixer housing. This orifice can be located at other points along the exterior portion of the housing to permit entry of foodstuffs into the housing for purposes of mixing between and by the multiple screws. Also, on the top portion of the exterior portion of the housing, rather than a fully cylindrical surface, e.g., between the orifice and each end of the housing exterior, the surface can have cut-outs such as ones having a scalloped or scooped-out appearance to provide a reduced, but ergonomically curved dimension so as to have substantially less overall thickness and mass, but remains of sufficient thickness to provide durability and longevity of use substantially equivalent to a conventional fully cylindrically-shaped top portion of a food processing housing.

In another aspect, the exterior of the above-mentioned housing has a bottom portion, and rather than a fully cylindrical surface, the surface of the bottom portion also has cut-outs, such as having a double scalloped or scooped-out appearance so that the bottom exterior can have two scalloped or scooped-out portions, e.g., ones meeting at a linear point or area, so that the bottom exterior portion also has a reduced, but ergonomically curved, dimension so as to have substantially less overall thickness, but which also remains of sufficient thickness and configuration to provide durability and longevity of use substantially the same as a largely conventional fully cylindrically-shaped bottom portion of a food processing housing.

In another aspect, a method for centering and securing the essentially zero contact multiple/double screw-screw housing units in a vacuum filler, which includes or is linked to a vacuum filler operator is provided. The method includes the steps of placement of a discharge end of a multiple/double screw inside the same end of a screw housing dimensioned so that the inner diameter of the screw housing and the outer diameter of the multiple/double screw unit are matched throughout the parallel dimensions of the two so that any contact is eliminated or substantially reduced when the discharge end of the multiple/double screw is centered and secured by a multi-pronged, e.g., cross-like support segment. In the multi-pronged support embodiment employing a cross-like support, the segment includes a substantially vertical first cross portion with top and bottom halves designed to fit securely into notches located at the top and bottom of the discharge end of the screw housing. The cross-like support segment also includes a substantially horizontal second cross portion with first and second lateral side portions, each of which defines a bored hole for the insertion of a bolt.

The left and right bored holes of the horizontal second cross portion are configured to align with mated holes at the center of the discharge end of each of the screws/screw units. Thus, shouldered bolts or other fasteners, as described above, slide securely both into the laterally spaced bored holes of the cross-like support segment and into the mated holes at the center of the discharge end of each of the screws. Accordingly, this method serves to center and secure the screws inside the screw housing, aiding in providing substantially zero, or at least substantially reduced, metal to metal contact between the screw units and the screw housing prior to use for food processing. Once the shouldered bolts or other fasteners are screwed or otherwise locked into place, the shouldered bolts and related centering ensemble serve to completely prevent or substantially minimize the outer diameter of the screw unit from rubbing against the inner diameter of its screw housing. After these are fully secured, the vacuum filler operator linked to the filler is then turned to its on position.

BRIEF DESCRIPTION OF THE DRAWINGS

The presently disclosed subject matter will be better understood from reading the following description of non-limiting embodiments, with reference to the attached drawings, wherein below.

DESCRIPTION OF THE PREFERRED EMBODIMENT

Figure 1:
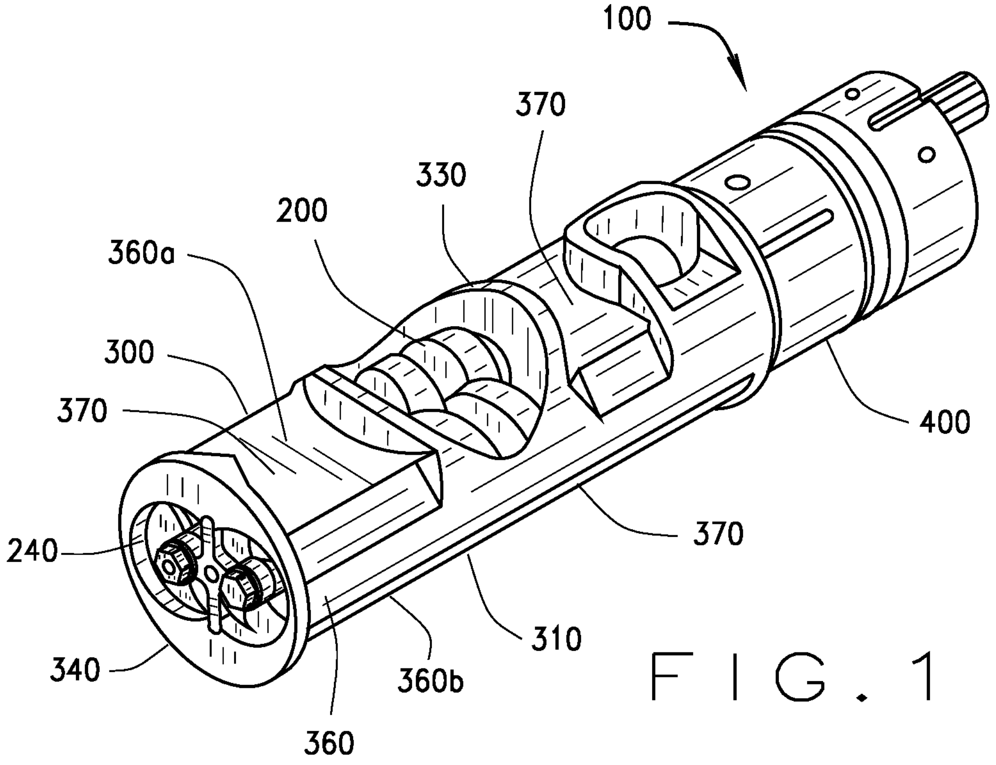
FIG. 1 is a top side perspective illustration of an embodiment of an essentially zero contact double screw plus double screw housing unit according to the disclosure in which the cross support and centering segment and shouldered bolts have been installed and also showing a view of the top of the housing in which portions of the generally cylindrical outer surface have been removed.
Figure 2:
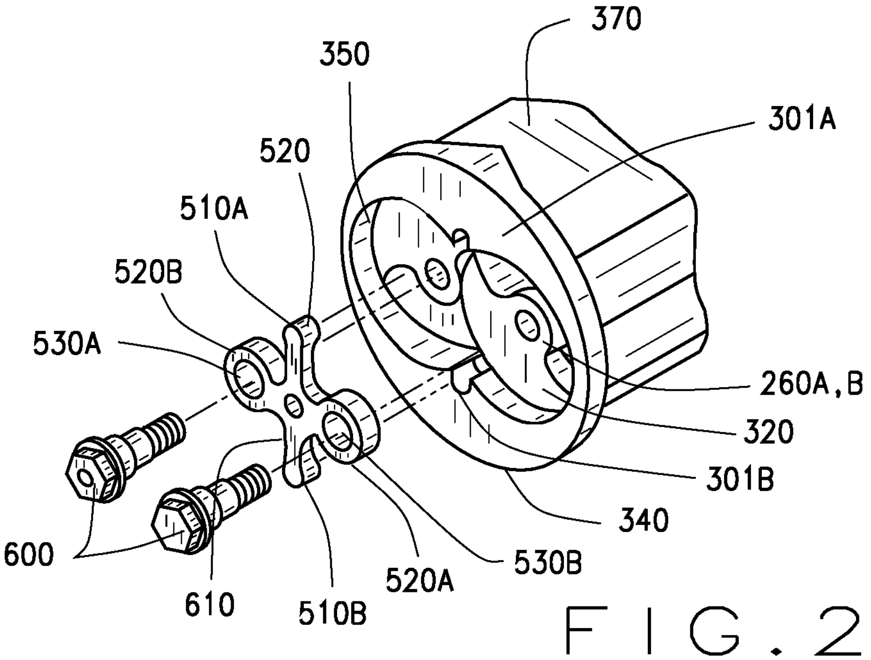
FIG. 2 is an exploded close up view showing the various components at the discharge end of the essentially zero contact double screw plus double screw housing unit of the embodiment of FIG. 1.

The foregoing summary, as well as the following description illustrates the disclosure by way of example and not by way of limitation. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. As apparent in the drawings, unless stated otherwise, the parts numbered for one illustration are intended to correspond to the same numbered parts throughout the drawings.

As discussed above, in a standard prior art screw plus screw housing combination, the useful life for these key parts of a vacuum filler, portioning, and packaging apparatus is significantly diminished by the constant rubbing and metal upon metal fatigue these parts undergo.

As noted above, portioning devices can have multiple portioning screw or worms. However, these are usually present as entwined "double screws", and that terminology will be used throughout the detailed descriptions as representative of multiple, e.g., triple- or quadruple-screw portioning devices. Accordingly, as seen in FIG. 1, the combination double screw plus double screw housing unit 100 consists of two rotating screws (the double screw 200) fitted fairly snugly inside the double screw housing unit 300. The double screw consists of a large, left-handed screw 210, and a large right handed screw 220 in which the screw shanks 230 of the double screw 200 are intimately entwined around each other inside the housing unit 300 in a substantially continuous double-curved fashion and rotate within the housing unit 300 to portion, mix, extrude and process various foodstuffs.

The double screw housing 300 is a substantially cylindrical, typically one-piece stainless-steel sleeve 310 dimensioned to slide into a cylindrical slot in a vacuum filler device (not shown). The double screw housing also consists of a through bore 320 in which the double screw is inserted so that food portions can be dropped into or vacuum-pulled through a funnel-like chute into the section of the vacuum filler's double screw housing containing an opening 330 accessing the double screw such as to allow the food material to be processed as a drive 400 rotates the double screw 200 and moves the food being processed, mixed, extruded and/or packaged out the discharge end 340 of the double screw housing 300.

The curved shank 230 of each of the two halves (screws) of the double screw 200, and their housing unit 300 as a whole, are arranged in a substantially horizontal direction in relationship to the vacuum filler machine as a whole (not shown). As the mixing and filler machine processes the foodstuffs, parcels of food are dropped or pulled by vacuum pressure through an entrance hole or opening 330 into the housing unit 300 and are mixed and massaged into a predetermined processed configuration before extrusion.

As previously noted, the double screw 200 has previously been supported inside the double screw housing 300 solely by a centering pin 240, which can be located on the end of the drive, as shown, or on the drive end 250, i.e., the end of the double screw that attaches to the drive 400. Given the close contact and the parts' ongoing interaction, such a support system has not proven to be sufficient to prevent the outward directed force provided by the outer diameter of the double screw 200 constantly rubbing against the inner diameter of the double screw housing 300 and thus generating constant friction between these two parts resulting in chronic wear and a reduced useful life of these parts.

As depicted in the Figs., Applicant discloses an improved double screw plus double screw housing unit system 100 which provides for an essentially zero contact, no, or substantially reduced, frictional interaction between the double screw 200 and a highly ergonomic, substantially lighter double screw housing unit 300. It thus effectively overcomes the above deficiencies of prior combination double screw/double screw housing units, substantially improves the useful life and functionality of these parts, and completely avoids or substantially minimizes the fatigue and failure issues previously discussed. Given their central role, these innovations improve the long-term operation of the food processing and packaging apparatus as a whole.

In an embodiment, the double screw 200 and double screw housing 300 combination device 100 as provided includes a multi-pronged support segment 500 (see FIG. 5) at the discharge end 260 of the double screw unit 200 which serves to connect the double screw 200 to the double screw housing 300 to support and space the double screw unit 200 apart from the surrounding double screw housing 300. The multi-pronged support segment can be dimensioned to have a cross-like support segment 500 but can have other dimensions of attachment or numbers of prongs for attachment to provide the functional spacing and support as envisioned herein. Representatively, hereinafter, the multi-pronged support segment will be described as a cross-like support 500 and includes a substantially vertical first cross portion 510 with top **510*a* and bottom 510*b* halves to fit snugly into notches 301*a*** and *b* located at the top and bottom of the discharge end 340 of the double screw housing 300. The cross-like support segment 500 includes a substantially horizontal second cross portion 520 with first **520*a* and second 520*b* lateral side portions, each of which defines a bore 530*a*, 530*b* for the insertion of a bolt. Shouldered bolts 600 or other such fastener parts are secured into the bore at the discharge end through each of these holes 530*a,b*. In turn, at the center of the discharge end 260 of each of the handed screws 210, 220 of the double screw 200 is a mated hole 260*a,b* for a corresponding lateral hole 530*a*, 530*b* of the cross-like support 500. Thus, the shouldered bolts 600 slide both into and through the laterally spaced bored holes 530*a*, 530*b* of the cross-like support 500 and into the mated holes 260*a*, 260*b* at the center of the discharge end 260 of each of the left and right-handed portions 210 and 220 of the double screw 200. Accordingly, this combination serves to center and secure the double screws inside the double screw housing, aiding in providing zero, or at least substantially reduced, metal to metal contact between the double screw unit 200 and the double screw housing unit 300**. To further assist in producing zero, or substantially reduced contact within these important parts of the device, the inner diameter of the double screw housing and the outer diameter of the double screw unit may be precision machined to be matched throughout the parallel dimensions of the two so that any contact is eliminated or substantially reduced when the discharge end of the double screw is so centered and secured.

In another aspect, a multi-pronged, preferably substantially cross-like support and centering device 500 for installation at the discharge end 260, 340 of a double screw/housing unit 100 is presented herein. The support device 500 can be used to center and connect the double screw 200 to the double screw housing 300 to securely space the double screw unit apart from the surrounding double screw housing so as to align the two to fully avoid or substantially reduce contact between any portion of the outer diameter of the double screw and the inner diameter of the double screw housing. As discussed above, the cross-like support segment 500 includes a substantially vertical first cross portion 510 with top 510*a* and bottom 510*b* halves configured to fit snugly into notches 301*a*, 301*b* or similar receptacle areas located at the top and bottom of the discharge end 340 of the double screw housing 300 for their secure placement. The cross-like support segment 500 also includes a substantially horizontal second cross portion 520 with first 520*a* and second 520*b* lateral side portions, each of which defines a bore 530*a* and 530*b* at a position facing a center hole of the discharge end 260 of each of the double screw halves 210, 220 for the insertion of a bolt or other fastener. Such shouldered bolts 600 or other fasteners for securing the cross-like support into the center holes of the discharge end of each of the double screw portions can be part of the cross-like securement ensemble 500 or provided separately.

A standard double screw housing 300 is a fully cylindrical, heavy (generally 60-70 pounds), one-piece stainless-steel piece, dimensioned to slide into a cylindrical slot in such a vacuum filler food processing device.

The preferred housing 300 of the disclosure, like a standard housing, also includes an internal, substantially cylindrical, through bore 320 throughout its length, above which food portions are dropped through a funnel-like chute or hopper (not shown) into the housing 300, and into which the double screw unit 200 has been inserted to substantially fill its length so that the section of the foodstuff filler's double screw housing 300 containing an opening, or orifice 330 accessing the double screw 200 is such as to allow the food material to enter and be processed. In an embodiment of the disclosure, a drive motor 400 rotates the left and right-handed, preferably entwined, double screws 210, 220 to move the food being processed, mixed, portioned and/or packaged out the discharge end 340 of the double screw housing 300.

While the above features of a screw housing for use in combinations of screw-screw housing components may be the same or similar to standard double screw housings, the present disclosure preferably differs significantly in being characterized in having a much more ergonomic, lighter weight housing 300, which allows for easier handling and cleaning for sanitation purposes after each of its regular and ongoing uses.

Figure 3:
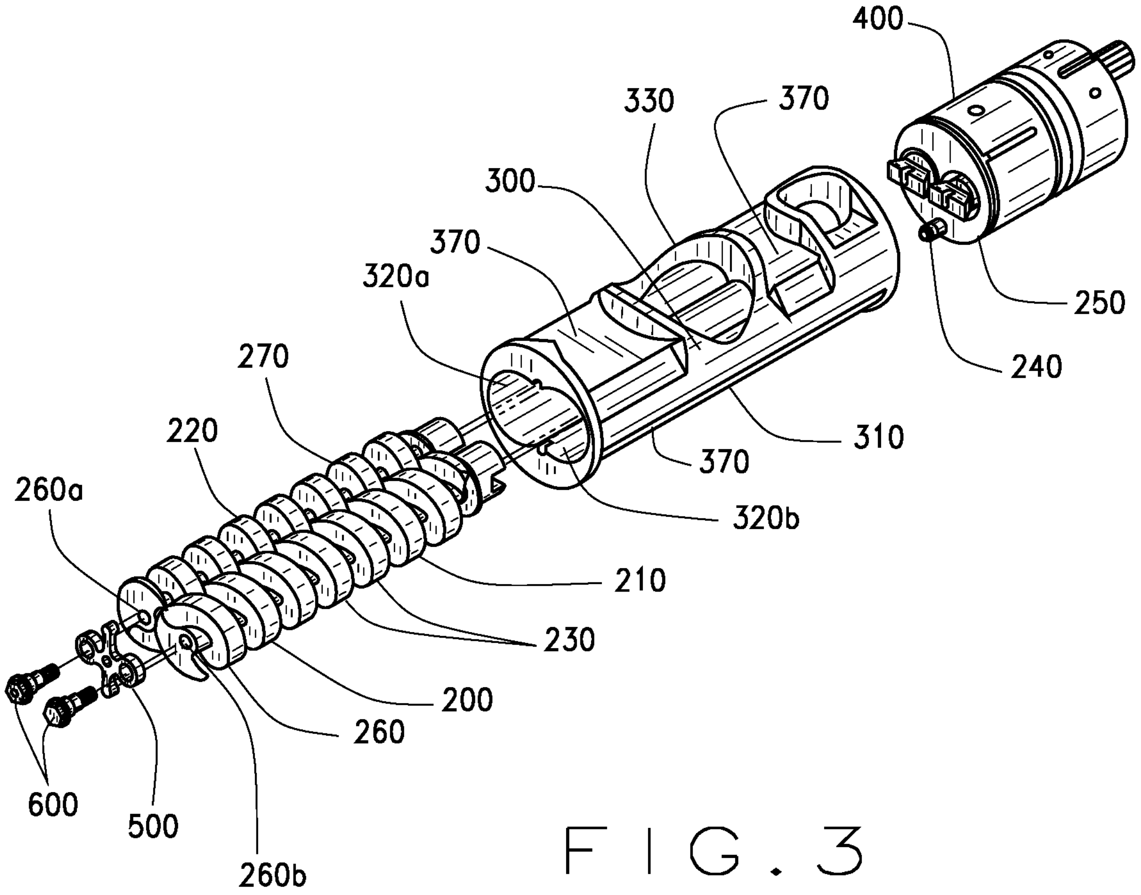
FIG. 3 is an enlarged view of an exploded top side perspective of the embodiment of FIG. 1 in which the alignment of the shouldered bolts, the cross-like support segment, and the discharge end of the double screw unit is shown as it will be housed inside the discharge end of the double screw housing.

Referring to the Figs. described above, the preferred ergonomic double screw-screw housing of the disclosure contains cut-out portions in exterior portions 360 of the housing 300 (see FIGS. 1 and 3).

Like a conventional double screw housing, the preferred ergonomically designed housing 300 has a substantially cylindrical through or internal bore 320 throughout the length of a substantially cylindrical internal portion 350 into which the double screw can fit into and an exterior portion 360, with an open area at the drive end of the housing 300 for insertion and attachment of the double screw unit 200 to the drive 400, and at the discharge outlet 340 (for the now processed foodstuff) of the housing 300. Also, in a preferred embodiment, in the exterior 360 of the housing, rather than a fully cylindrical surface, e.g., between the orifice 330 and each end of the housing exterior, the surface has cut outs, preferably substantially scalloped or scooped-out sections 370 to provide for an ergonomically curved, dimension so as to have substantially less overall thickness, volume and mass, but which remains of sufficient thickness, volume and mass to provide durability and longevity of use the same or similar to a substantially conventional cylindrically-shaped food processing housing.

It should be noted that in preferred embodiments, areas of the exterior portion 360 remain as flanges or reinforced portions, e.g., around the screw insertion openings, the discharge end 340 and the orifice 330 of the housing 300.

In another preferred alternative embodiment of the disclosure, an ergonomically designed double screw housing 300 has a substantially cylindrical internal bore 320, but wherein the internal bore 320 of the housing has two somewhat overlapping internal, cylindrical bores 320*a*, 320*b*, so as to have the combined appearance of the outline of a figure-eight. In this aspect, the figure-eight appearing internal bore 320*a*, 320*b* is substantially form-fitted for two interleaving helically shaped double screws 210, 220 to closely fit together within.

Typically, and preferably, according to the disclosure, the curvature of each of the multiple, scalloped or scooped-out areas of the housing will have an external taper machined to a dimension pre-calculated and/or pre-tested to facilitate durability and longevity of service, yet which make for a substantially lighter weight, ergonomic construction. This ergonomic feature has been shown to be effective in substantially all sizes of double screw housings. Similarly, typically, and preferably, according to the disclosure, the curvature of each of the scalloped portions located on the top portion of the housing will also have an external taper machined to a dimension pre-calculated and/or pre-tested to facilitate durability and longevity of service, yet which can make for a much lighter, ergonomic construction. Depending on the ergonomic curvature employed (and the material used to construct the housing), a weight-reduction of greater than 25% can be achieved, preferably greater than 30%, still more preferably greater than 35%, yet more preferably greater than 40%, and yet still greater than 45%, compared to a housing which is of the same material, but does not employ any of the ergonomic scalloped/scooped-out curvatures as demonstrated in the disclosure herein.

In preferred embodiments, the double screws and double screw housings of the disclosure are designed and built using stainless steel due to its corrosion resistance properties. Alternative materials can be utilized, however, and enjoy a similar reduction in weight and increased longevity of use advantages comparative to double screw-double screw housings of the same material, by utilizing the principles as described herein. For example, the material used to construct the double screw-ergonomic double screw housing could be changed to a cast-iron material, as used in some prior standard housings, or to a ceramic/alloy matrix, if desired, for certain uses. Other types of materials will no doubt be introduced as new technological embodiments are introduced.

To install the securement and centering segment to provide for the essentially zero contact double screw-ergonomic double screw housing units in a vacuum filler, e.g., in the illustrated embodiment, the above described cross-like securement ensemble is attached at the discharge end 260 of the double screw 200 inside the same end 340 of the double screw housing 300. These are preferably dimensioned so that the inner diameter 350 of the double screw housing 300 and the outer diameter 270 of the double screw unit 200 are precisely matched throughout the parallel dimensions of the two so that all contact is eliminated or substantially reduced when the discharge end of the double screw 200 is centered and secured by the addition of the cross-like support segment 500 as described. The top and bottom halves 510*a,b* of the vertical first cross portion 510 the cross-like support segment can be fitted into notches or small securement locks, or devices located, e.g., at the top and bottom of the discharge end of the double screw housing. Further, the left and right bores 530*a,b* of the horizontal second cross portion are placed in alignment with the mated holes 260*a,b* at the center of the discharge end 260 of each of the double screw portions. Thus, shouldered bolts 600 or other fasteners, as described above, are inserted to slide snugly through both the laterally spaced holes 530*a,b* of the cross-like support segment 500 and into the mated holes 260*a,b* at the center of the discharge end 260 of each of the double screw portions 200. See FIG. 3. Thus, this method serves to center and secure the double screw inside the double screw housing, thereby providing for substantially zero metal to metal contact between the double screw and the double screw housing.

As mentioned above, the centering and securing segment may be formed as another multi-pronged segment besides the cross-like segment described here, but its method of attachment and its use to center and secure the double screw and ergonomic double screw housing in essentially zero contact juxtaposition would substantially apply these steps and approach using a multi-pronged segment and fasteners to center and secure the discharge ends of the screw and housing units in a juxtaposition that provides for essentially zero contact between them.

Thus, once the shouldered bolts are screwed or otherwise locked into place, the shouldered bolts and related centering ensemble serve to essentially prevent the outer diameter of the double screw from rubbing against the inner diameter of the double screw housing. After these are fully secured, the vacuum filler operator linked to the filler is then turned to its on position to operate the machinery in a friction-free manner.

Alternatives can be provided with regard to various components of the above secured and centered double screw/ergonomic double screw housing system, cross-like support and centering apparatus and ensemble, and the methods as described above. These alternative embodiments and others may be introduced as such new embodiments are introduced. For example, as mentioned, the shape of the multi-pronged, cross-like support segment may be changed to another configuration as long as adequately secure support and friction-free centering are thereby still provided and the functioning of the discharge end of the double screw and housing units is not significantly interfered with as a result. Also, the material used to construct the ensemble can be changed due to manufacturing or cost efficiency considerations, or for considerations such as those relating to longer use or better sanitation, e.g., to match the nature of the foodstuffs being processed in some regard.

In view of the above, it will be seen that the several objects of the invention are achieved, and other advantageous results are obtained. As various changes could be made in the above constructions without departing from the scope of the disclosure, it is intended that all matter contained in the above description or shown in the accompanying drawings shall be interpreted as illustrative and not in a limiting sense.

What is claimed is:

1. A multiple screw and screw housing combination system comprising multiple screw portions for mixing foodstuffs and a screw housing for containing the multiple screw portions when in use, the multiple screw portions, and screw housing each having a drive end and a discharge end, the multiple screw portions having one or more holes at the discharge end and the screw housing having one or more notches or securement points at the discharge end of the screw housing, a multi-prong support segment at the discharge end of the multiple screw portions and screw housing which connects and secures the multiple screw portions to the screw housing to support and space the multiple screw portions apart from the surrounding screw housing when in use in a configuration to reduce or eliminate contact between the outer surface of the multiple screw portions and the inner surface of the screw housing, the multi-prong support segment comprising at least a first section with first and second portions configured to fit into notches located at substantially opposite segments of the discharge end of the screw housing, and at least a second section also with first and second portions, the second section also defining holes for the insertion of a fastener, the fastener being configured to be secured through one of the holes of the multi-prong support segment and into a mated hole in the discharge end of one of the multiple screw portions.

2. The multiple screw and screw housing combination system of claim 1 wherein the multiple screw portions comprise a double screw, the double screw comprising a left and a right handed double screw having holes at the discharge end of each of the left and right handed screw of the double screw and the double screw housing having notches or securement points at the top and bottom of the discharge end of the housing, and wherein the multi-prong support segment comprises a cross-like support segment, the cross-like support segment comprising a first cross portion with two halves configured to fit into notches located at substantially opposite ends along the discharge end of the screw housing, and a second cross portion with first and second sides defining holes for the insertion of the fasteners.

3. The multiple screw and screw housing combination system of claim 1 wherein the inner surface of the screw housing and the outer surface of the multiple screw portions are machined to substantially match and align throughout their parallel dimensions to eliminate or substantially reduce any friction therebetween when the discharge end of the double screw is so centered and secured by the multi-prong support segment.

4. The multiple screw and screw housing combination system of claim 1 wherein the screw housing has an ergonomic exterior portion, wherein said ergonomic exterior portion is configured to provide for a substantially lighter housing than a fully cylindrical housing exterior portion yet retains substantially the same durability given the same usage and material composition as for an otherwise comparable fully cylindrical housing.

5. The multiple screw and screw housing combination system of claim 4 wherein the exterior portion has top and bottom sections along a longitudinal axis of the screw housing, and on the top section, rather than a fully cylindrical surface, the surface has one or more carved out segments forming a scalloped or scooped-out appearance to provide an ergonomically curved dimension so as to provide for substantially less overall thickness, volume and mass, but of sufficient thickness and with a configuration to provide durability of use to a comparable substantially fully cylindrical exterior portion.

6. The multiple screw and screw housing combination system of claim 4 wherein the exterior portion has top and bottom sections along a longitudinal axis of the screw housing, and on the bottom section, rather than a fully cylindrical surface, the surface has one or more segments having a scalloped or scooped-out appearance to provide for a reduced, but ergonomically curved dimension so as to have substantially less overall thickness, volume and mass, but remains of sufficient thickness and with a configuration to provide durability of use of a comparable substantially fully cylindrical exterior portion.

7. The multiple screw and screw housing combination system of claim 2 wherein the internal bore of the screw housing has two overlapping internal, substantially cylindrical bores.

8. A multi-prong support segment for use at discharge ends of multiple screw portions and screw housing combinations in food processors, which connects and secures the multiple screw portions to the screw housing to support and space the multiple screw portions apart from the surrounding screw housing when in use in a configuration to reduce or eliminate contact between the outer surface of the multiple screw portions and the inner surface of the screw housing, the multi-prong support segment comprising at least a first section with first and second portions configured to fit into notches located at substantially opposite segments of the discharge end of the screw housing, and the multi-prong segment having at least a second section also with first and second portions, the second section defining holes for the insertion of fasteners, the defined holes being configured such that the fasteners can be secured through the defined holes of the multi-prong support segment and into mated holes in the discharge end of one of the multiple screw portions.

9. The multi-prong support segment of claim 8 wherein the multi-prong support segment comprises a substantially cross-like support device, wherein the cross-like support segment comprises a substantially vertical first cross portion with top and bottom halves configured to fit into the receiving notches and the cross-like support segment further comprises a substantially horizontal second cross portion with first and second lateral side portions, each of which defines a bore at a position aligned to face a hole of the discharge end of a left handed or right handed screw of a double screw for the insertion of a bolt or other fastener configured for securing the cross-like support into holes at the discharge end of each of the left and right handed screw of the double screw.

10. A method for securing essentially zero contact multiple screw-screw housing units together in a vacuum filler linked to a vacuum filler operator, each having a discharge end, the method comprising the steps of placing the multiple screw unit inside the screw housing so that the discharge end of the multiple screw unit is in close proximity to the discharge end of the screw housing unit, wherein the units are dimensioned so that the inner surface of the screw housing and the outer surface of the multiple screw unit are substantially matched throughout the parallel dimensions of the two so that any contact is eliminated or substantially reduced when the discharge end of the multiple screw unit is centered and secured by a multi-prong support segment, the multiple screw unit having holes at the discharge end and the screw housing having notches or securement points also at the discharge end of the screw housing, attaching a multi-prong support segment at the discharge end of the multiple screw unit and screw housing to connect and secure the multiple screw unit to the screw housing to support and space the multiple screw unit apart from the surrounding screw housing when in use in a configuration to reduce or eliminate contact between the outer diameter of the multiple screw unit and the inner diameter of the screw housing, the multi-prong support segment comprising at least a first section with first and second halves configured to fit into notches or securement points located at opposite segments of the discharge end of the screw housing, and at least a second section having first and second halves, the second section defining holes for the insertion of fasteners, such as a shouldered bolts, the fasteners being configured to be secured through one of the holes of the multi-prong support segment and into a mated hole in the discharge end of each of the multiple screw units.

11. The method of claim 10 wherein the multiple screw-screw housing units are left and right-handed double screw-screw housing units and the discharge end of the double screw is centered and secured to the screw housing unit by a cross-like support segment, the cross-like support segment comprises a substantially vertical first cross portion with top and bottom halves designed to fit into notches or other securement points located at the top and bottom of the discharge end of the double screw housing and the cross-like support segment further comprises a substantially horizontal second cross portion with first and second lateral side portions, each of which defines a left or a right bore for the insertion of a fastener such as a shouldered bolt, the left and right bore of the horizontal second cross portion are configured to align with mated holes at the discharge end of each of the left and right handed screw of the double screw and the screw housing.

* * * * *